United States Patent [19]

Clements

[11] 3,718,775

[45] Feb. 27, 1973

[54] TAPE RECORDERS PROVIDING REPLAY WITHOUT STOPPING OR REWINDING

[75] Inventor: Paul Bernard Clements, Hove, Sussex, England

[73] Assignee: Words on Wheels Limited, London, England

[22] Filed: Aug. 7, 1970

[21] Appl. No.: 61,952

[30] Foreign Application Priority Data

Aug. 15, 1969 Great Britain ....................40,958/69
Sept. 10, 1969 Great Britain ....................44,686/69

[52] U.S. Cl. ........179/100.2 T, 35/35 C, 179/100.2 B
[51] Int. Cl. ....G11b 27/36, G11b 21/12, G11b 23/16
[58] Field of Search ................179/100.2 T, 100.2 B; 274/11 D, 4 D; 35/35 C; 178/6.6 FS, 6.6 A, 100.1 DR, 100.1 VC

[56] References Cited

UNITED STATES PATENTS

| | | | |
|---|---|---|---|
| 2,832,840 | 4/1958 | Morin | 178/6.6 FS |
| 2,195,701 | 4/1940 | Kent | 179/100.2 T |
| 2,885,485 | 5/1959 | Eigen | 179/100.2 B |
| 3,499,997 | 3/1970 | Kosugi et al. | 179/100.2 T |
| 3,157,738 | 11/1964 | Okamura | 178/6.6 A |
| 3,491,462 | 1/1970 | Ward | 35/35 C |

*Primary Examiner*—Bernard Konick
*Assistant Examiner*—Alfred H. Eddleman
*Attorney*—Seidel, Gonda & Goldhammer

[57] ABSTRACT

A tape recorder particularly for use in language laboratories, with a facility for providing a replay of a short section, such as a phrase up to 15 seconds in length, without reversing the tape. This facility is achieved by providing a play head which is mounted in a spool over which the tape runs and which is adapted to drive against the advance direction of the tape to traverse the head back along the tape. In one form of the invention, the tape is stationary during replay and in a second form, the forward drive of the tape continues.

6 Claims, 4 Drawing Figures

INVENTOR
PAUL BERNARD CLEMENTS

INVENTOR
PAUL BERNARD CLEMENTS.

INVENTOR
PAUL BERNARD CLEMENTS

TAPE RECORDERS PROVIDING REPLAY WITHOUT STOPPING OR REWINDING

This invention relates to tape recorders, and more particularly to tape recorders for use in applications where an accurate replay facility for recently recorded signals is desired. Tape recorders according to the invention are particularly useful in language laboratories, but their use is not necessarily so limited.

If conventional tape recorders are used for replaying phrases in language laboratories, their tapes must either be rewound repeatedly or else the play head must be so positioned that there is a considerable length of tape between it and the recording head.

The first method demands an automatic place-finding device or a lot of judgment from the operator and subjects the replay mechanism to a lot of wear and tear. The second method eliminates these drawbacks, but is open to the objection that a varying interval of time must elapse—depending on the duration of the phrase—before replaying occurs.

According to the present invention, there is provided a tape recorder having a play head mounted for movement with the tape along part of its path between a recording head and a take up spool, and means for causing the play head to traverse back along the tape to provide a replay facility.

In a first embodiment of the invention, the play head is mounted on a drum or spool with a circumference sufficient to accommodate, in less than one turn, tape on which is recorded a phrase of the maximum length likely to be replayed. For a tape speed of 1⅞ inches per second, a drum with a circumference of 30 inches would accommodate enough tape for a 15-second phrase or other short section.

In this embodiment, the tape is stationary during replay and in a further form of the invention this stopping of the tape is eliminated.

According to such further form of the invention, a tape recorder includes a recording head and a play head, each mounted for movement with the tape along part of its path, means for causing the recording head to traverse back against the direction of movement of the tape to provide a recording facility while the play head is moving in the direction of movement of the tape, and means for causing the play head to traverse back against the direction of movement of the tape to provide a replay facility while the recording head is moving in the direction of movement of the tape.

Preferably, the recording head is mounted in the rim of a record spool, and the play head is mounted in the rim of a play spool, and the record spool is mounted between the storage spool of the tape recorder and the play spool, and the play spool is mounted between the record spool and the take up spool of the tape recorder.

This embodiment provides the advantages that recording and replaying can be effected without stopping or re-winding the tape. In addition, because only the head or heads actually in use will slide relative to the tape at any given time, wear on the erase, record and play heads is reduced. Also, the short section to be replayed is accommodated on both the record spool and the play spool, so that the size of the spools is reduced as compared to the single drum or spool of the first embodiment.

The invention will be further described with reference to the accompanying drawings, in which.

Figure 1:
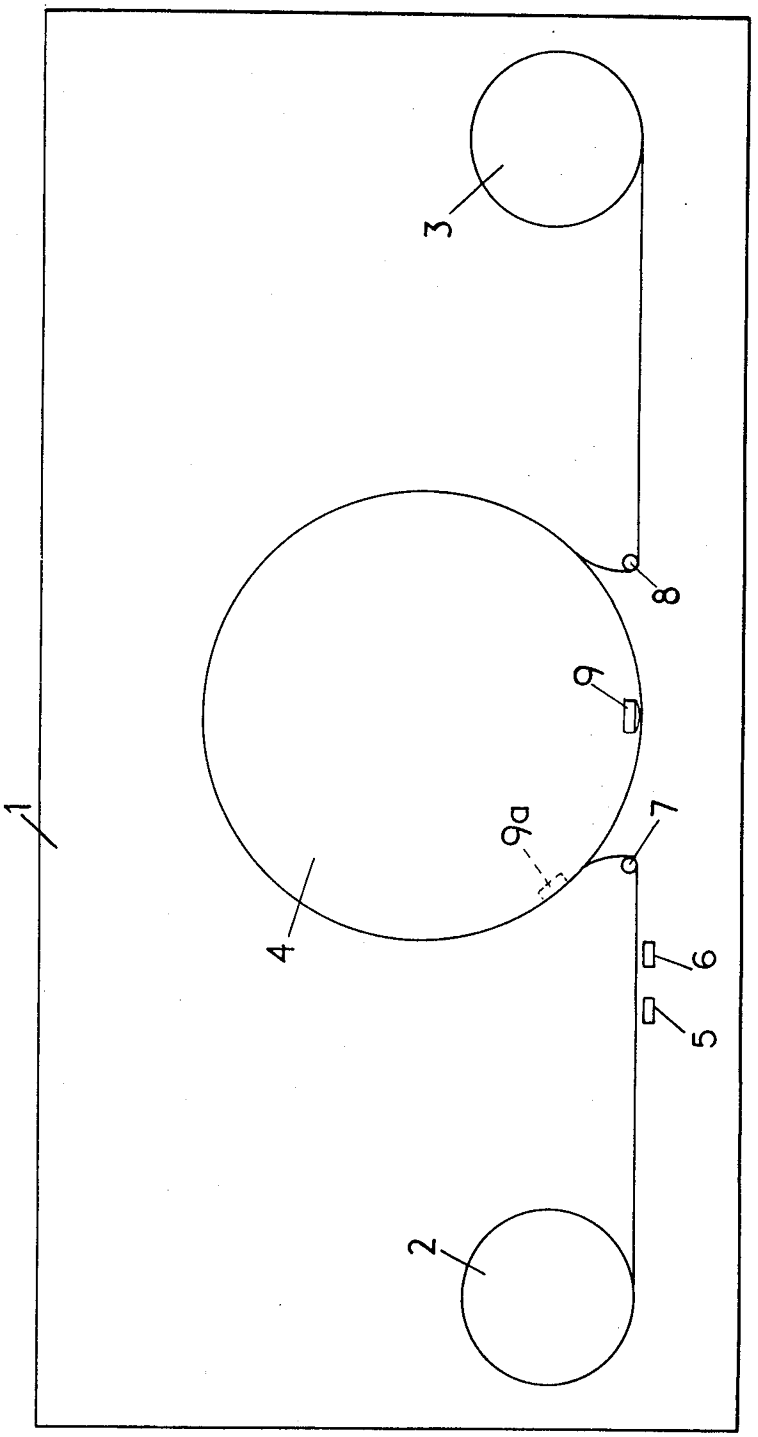
FIG. 1 is a diagrammatic layout of a form of tape recorder according to the invention.

FIG. 1 shows diagrammatically a tape deck 1 including a storage spool 2, a take up spool 3 and an intermediate and somewhat larger replay spool 4. The tape is wound from the spool 2 past an erase head 5, a recording head 6 and over a guide 7 on to the replay spool 4. From the replay spool 4 the tape passes over a guide 8 and onto the take up spool 3. The rim of the replay spool 4 has a low coefficient of friction, and in the rim there is embedded a play head 9, having a rest position illustrated in full lines.

When recording is required on a straight through basis, i.e., with no replay facility, then the replay spool 4 is stationary, preferably with the play head in the rest position and the tape slides round it. If no separate play head is provided, then the play head 9 may be used in the normal play back operation by arranging that the spool 4 should come to rest in a position such that the play head takes up the position shown dotted at **9*a***, at least during the play back operation.

When recording followed by immediate replay of a short section is required, the replay spool 4 is released so as to be free to rotate with the tape which is kept under sufficient tension to entrain the replay spool 4 in its motion. The position of the recording head 6 relative to the play head 9 in its initial position is such that the play head comes into contact a short distance, e.g., one-fourth inch, in advance of the beginning of the recording and remains in this position relative to the recording as the spool 4 is rotated by the tape.

The spool 4 is chosen of sufficiently large diameter that it will not complete a revolution within the compass of a short section to be repeated, i.e., it takes more than 15 seconds or some similar time period to complete a revolution, and when replaying is required, the tape is stopped and held stationary and the spool 4 is caused to rotate in the reverse direction whereby the play head moves back over the tape and replays the short section. During replay, the tape is preferably held stationary by means of a pinching mechanism. Preferably, also, in order that the tail end of the tape with the recorded short section can be played, the tape and play head is advanced somewhat after initiation of the replay cycle, but before replay commences.

When used in a language laboratory, the tape deck may include a static play head (not shown) between the recording head 6 and the guide 7 and located in the path of a track on the tape which does not traverse the recording head 6 and the play head 9. The lesson is recorded on this track and the student can follow the lesson in the usual way and at appropriate points can make his own attempts at recording the phrases given, using the recording head 6 and the other track, and these attempts can then be played back by the head 9. The tape needs to be rewound only if the student wishes to repeat and replay the phrases more than once.

Particularly for use as a dictation transcription machine, the spool 4 might be equipped with two or more equally spaced play heads. In normal use one of these play heads would be in use and set in the position 9a with spool 4 stationary. When the typist finds that a second playing of a short section is necessary, she would actuate a suitable control to cause the spool 4 to rotate anti-clockwise and bring the other or next in clockwise direction head into use against a stationary tape to replay the section just played. This mode would stop when this head reached position 9a and normal playing could then be resumed with this head or further replay could be obtained by repeating the operation.

Figure 2:
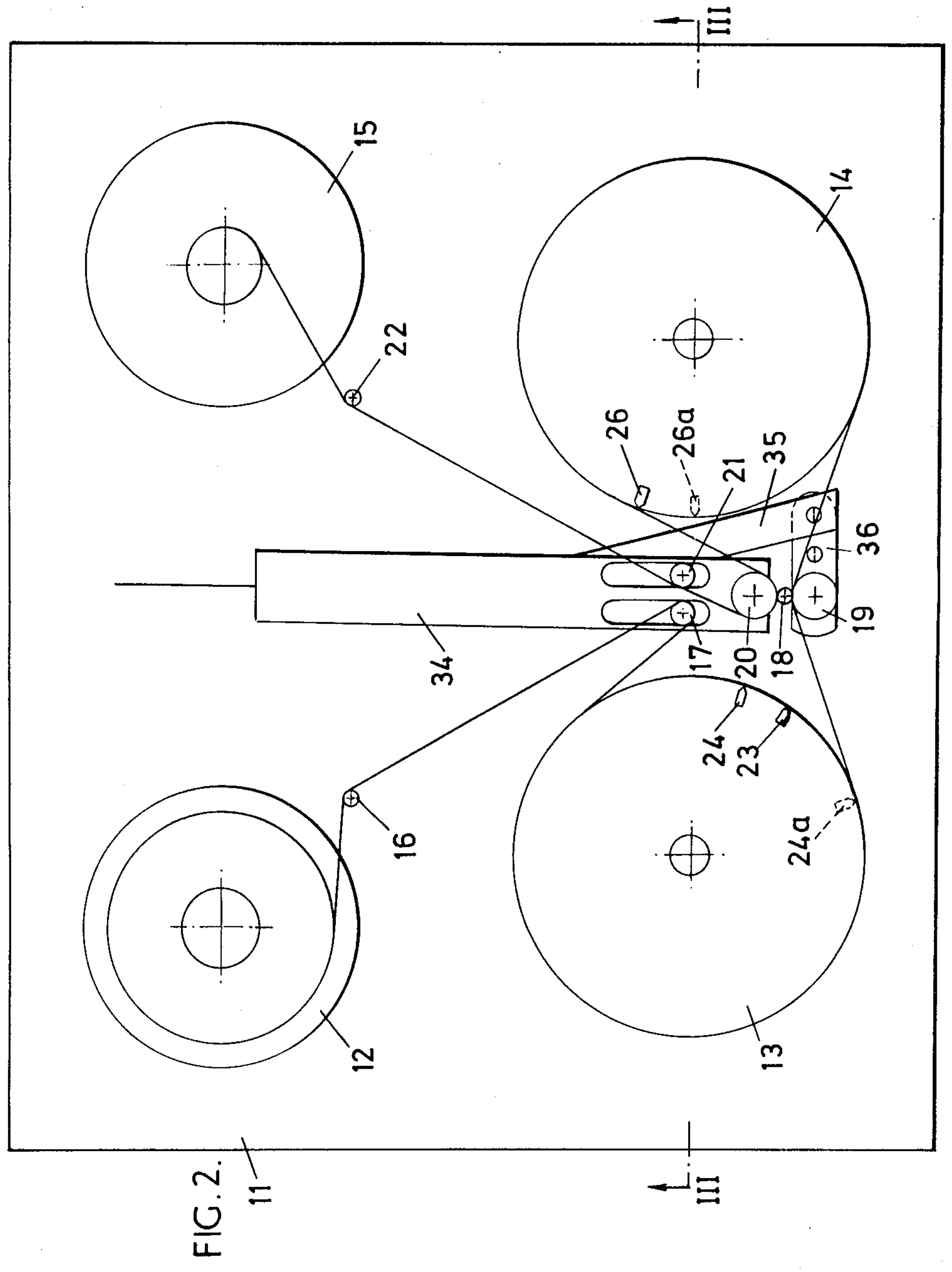
FIG. 2 is a diagrammatic layout of a further form of tape recorder according to the present invention, taken on the line II—II of FIG. 3.
Figures 3, 4:
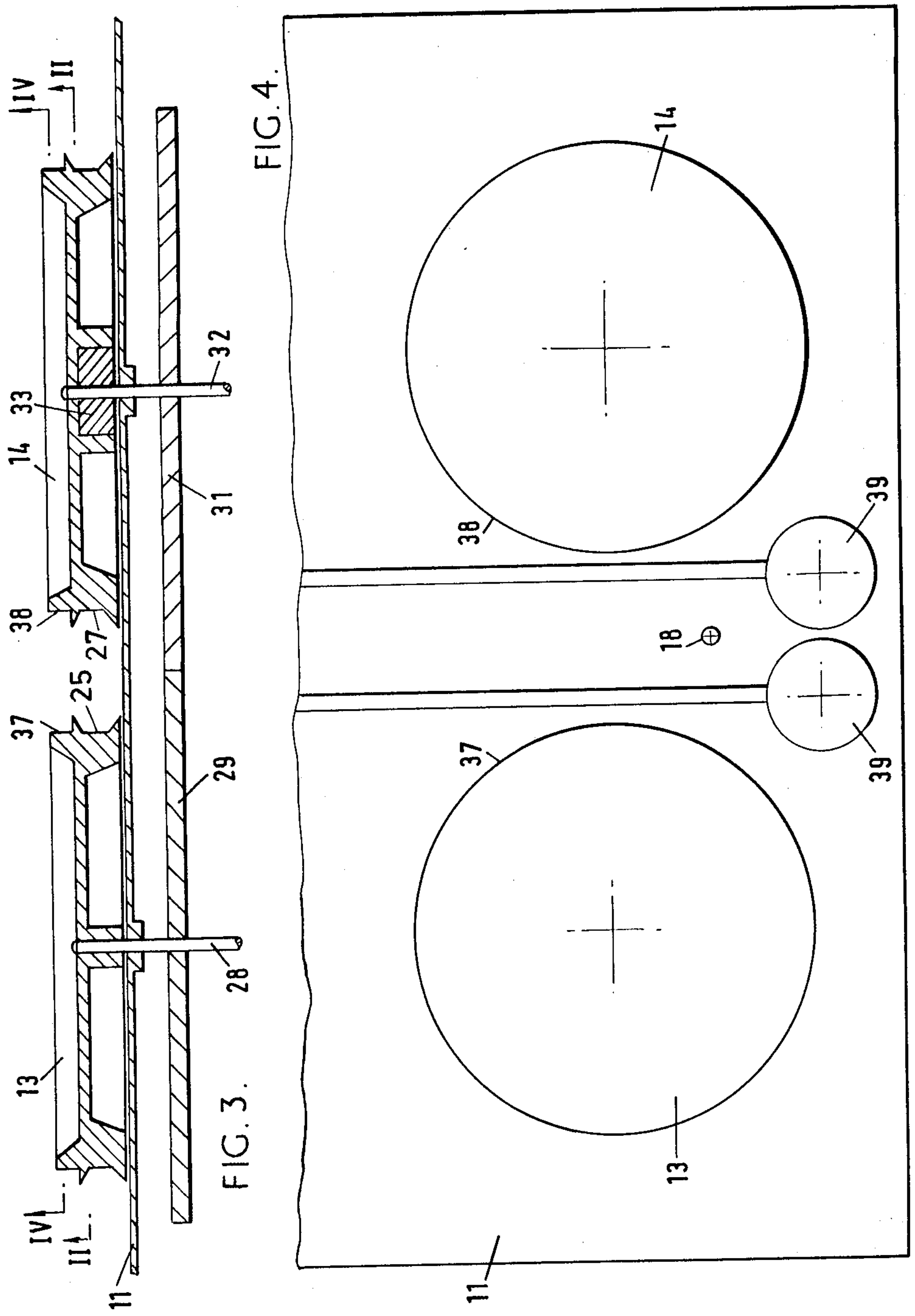
FIG. 3 is a sectional view, with parts omitted, on the line III—III of FIG. 2.
FIG. 4 is a view similar to FIG. 2, taken on the line IV—IV of FIG. 3, to illustrate the drive to the spools.

FIGS. 2 to 4 show a further embodiment of the invention comprising a tape deck 11 carrying a storage spool 12, a record spool 13, a play spool 14 and a take up spool 15. The tape is wound from the storage spool 12 over guides 16 and 17 and round the record spool 13. It then passes between a capstan 18 and a first pinch wheel 19, round the play spool 14, between the capstan 18 and a second pinch wheel 20 and over guides 21 and 22 to the take up spool 15.

The record spool 13 has an erase head 23 and a recording head 24 embedded in a lower rim 25 (see FIG. 3), while the play spool has a play head 26 embedded in the lower rim 27.

The record spool 13 is mounted on a shaft 28 carrying a gear 29 meshing with a gear 31 carried by a shaft 32 connected to the play spool 14 by a ratchet device 33 comprising a single pawl (not shown) cooperating with a notch to lock the shaft 32 and the spool 14 in one relative position when the spool is being driven anti-clockwise or the shaft is being driven clockwise.

The tape is driven by the capstan 18 and pinch wheels 19 and 20 and passes over the lower rims of the spools 13 and 14. As is conventional, the pinch wheels are sprung off the capstan and they are pressed on by a solenoid-operated slider 34 which carries the pinch wheel 20 and has an extension 35 articulated onto a pivoted lever 36 carrying the pinch wheel 19.

The drive to the spools is achieved selectively by providing each with a rim 37, 38 spaced from the rim 25, 27. Each rim 37 or 38 is associated with one of a pair of solenoid-actuated drive rollers 39 for engaging between an upper part of the capstan 18 and the associated rim 37 or 38.

As an alternative (or addition), the erase head 23 may be statically mounted on the deck 11, between the storage spool 12 and the guide 17. In operation as a conventional tape recorder, the record spool 13 and the play spool 14 are locked during recording and playing. During recording, tape travels from the storage spool 12 to the take up spool 15 at the recording speed of say 1⅞ inches per second passing over the record head 24 which is in a 5 o'clock position shown dotted at 24a, but not over the play head 26, which is in a 9 o'clock position shown dotted at 26a. During replaying, the tape speed and direction of travel are unchanged, but the play head 26 is in an 11 o'clock position and the record head 24 is in a 3 o'clock position out of contact with the tape.

During rewinding the storage spool 12 is driven in a clockwise direction, thus winding tape off the take up spool 15 and causing the ratchet 33 to disengage, thus permitting spools 13 and 14 to rotate in the same direction. When the tape's direction of travel is reversed after rewinding, spools 13 and 14 automatically assume their correct relative positions when the ratchet's pawl engages in the single notch.

In operation for either short section record or short section playback, the tape is fed from the storage spool 12 to the take up spool 15 at a speed of fifteen-sixteenths inches per second. Recording is effected by driving the play spool 14 anti-clockwise, i.e., with the tape, at fifteen-sixteenths inches per second, thus driving the record spool 13 clockwise against the direction of movement of the tape, at fifteen-sixteenths inches per second. Recording is thus effected at a speed of 1⅞ inches per second. The combined circumferences of spools 13 and 14 are such that any required length of short section or phrase required for immediate replay in a language laboratory can be accommodated on the tape around their rims. When recording of the short section has been completed, the playhead 26 will be approximately half an inch in front of the beginning of the recording; the machine will then be switched to play and after an interval of approximately one and a half seconds during which the spools continue to rotate in the recording mode, the drive to the play spool 14 will disengage and the drive to the record spool 13 will engage, causing it to rotate anti-clockwise, i.e., with the tape, at fifteen-sixteenths inches per second, thus causing the play spool 14 to rotate clockwise against the direction of movement of the tape at fifteen-sixteenths inches per second. Replaying is thus effected at a speed 1⅞ inches per second.

Various modifications may be made within the scope of the invention.

I claim:

1. A tape recording including a recording head and a play head mounted for movement in a single track of the tape along part of its path, means for causing the recording head to traverse back against the direction of movement of the tape to provide a recording facility while the play head is moving in the direction of movement of the tape, means for causing the play head to traverse back against the direction of the movement of the tape to provide a replay facility while the recording head is moving in the direction of movement of the tape, and a static play head in addition to said play head, said static play head being in the path of a track on the tape different from the track of the tape in which said play head and said recording head are movably mounted.

2. A tape recorder in accordance with claim 1 wherein said means for causing the play head to traverse back against the direction of the movement of the tape includes a spool having a circumference sufficient to accommodate, in less than one turn, sufficient tape to record a short section of the maximum length likely to be replayed, said play head being mounted on said spool for movement with the tape and for movement back along the tape.

3. A tape recorder as set forth in claim 1 including a storage spool and a take-up spool, said storage spool, record spool, play spool and take-up spool being mounted so that the tape traverses said record spool and then the play spool in its passage between the storage spool and the take-up spool.

4. A tape recorder in accordance with claim 1, comprising a static play head in addition to said play head, said static play head being in the path of a track on the tape different from the track of the tape in which said play head and said recording head are moveably mounted.

5. A tape recorder in accordance with claim 1 including a ratchet to free said record spool and said play spool from conjoint movement for rewinding the tape from said take-up spool onto said storage spool.

6. A tape recorder operable in a record and replay mode, comprising means for driving the tape continuously in one direction while operating in the record and replay mode, a record spool having a rim, a recording head mounted in said rim on said record spool, a replay spool having a rim, a replay head mounted in said rim on said replay spool, means interconnecting said spools for conjoint movement and means for reversibly driving said spools so that their rims move at tape speed with one of the heads moving at tape speed in the direction of movement of the tape and the other moving at tape speed in the direction opposite to that of the movement of the tape, whereby a recording operation is achieved when the recording head is moved against the movement of the tape and the replay head is moving with the tape and a replay operation is achieved by reversal of the direction of movement of the spools while the tape continues to move.

* * * * *